United States Patent [19]

Keller

[11] Patent Number: 5,013,282
[45] Date of Patent: May 7, 1991

[54] EXTENDIBLE SHAFT ASSEMBLY FOR PORTABLE TOOLS

[75] Inventor: Harold A. Keller, Clarkston, Wash.

[73] Assignee: Technic Tool Corporation, Lewiston, Id.

[21] Appl. No.: 439,286

[22] Filed: Nov. 20, 1989

[51] Int. Cl.$^5$ .............................. F16C 1/28; F16D 3/06
[52] U.S. Cl. ..................................... 464/172; 464/178; 464/180
[58] Field of Search ................. 464/52, 162, 170, 172, 464/177, 178, 180; 56/18, 328.1, 329, 332–340; 30/166.3, 383

[56] References Cited

U.S. PATENT DOCUMENTS

| | | | |
|---|---|---|---|
| 2,703,928 | 3/1955 | Southwick | 30/167 |
| 2,777,483 | 1/1957 | Cherem | 143/43 |
| 3,266,534 | 8/1966 | Carnesecca, Jr. | 143/32 |
| 3,291,167 | 12/1966 | Varden | 143/32 |
| 3,343,613 | 9/1967 | Carnesecca, Jr. | 173/169 |
| 3,618,340 | 11/1971 | Geisthoff et al. | 464/172 X |
| 3,657,813 | 4/1972 | Knight | 30/166 |
| 3,715,805 | 2/1973 | Fraser | 30/166 |
| 3,731,380 | 5/1973 | Mathiesen | 143/32 L |
| 3,731,382 | 5/1973 | Wroe | 30/381 |
| 4,048,722 | 9/1977 | Howard | 30/386 |
| 4,122,601 | 10/1978 | Katsuya | 30/296 A |
| 4,207,675 | 7/1980 | Causey et al. | 30/296 R |
| 4,341,017 | 7/1982 | Janczak | 30/381 |
| 4,505,040 | 3/1985 | Everts | 30/296 R |
| 4,654,971 | 4/1987 | Fettes et al. | 30/383 |
| 4,714,447 | 12/1987 | Hironaka | 464/180 X |

*Primary Examiner*—Daniel P. Stodola
*Assistant Examiner*—William G. Battista, Jr.
*Attorney, Agent, or Firm*—Wells, St. John & Roberts

[57] ABSTRACT

An extensible power shaft assembly used, for example, with a portable tree pruner includes a telescoping axial drive shaft assembly and a telescoping housing coaxially surrounding the drive shaft assembly. Overlapping ends of the telescoping drive shaft components are slidably mounted to one another and supported by an intermediate bearing assembly located at one end of one of the drive shaft sections. Provision is made at the opposite ends of the drive shaft sections for accommodating radial misalignment between interconnected driving and driven components. Provision is also made for preventing whipping of the unsupported sections of the elongated drive shaft sections.

16 Claims, 6 Drawing Sheets

Fig 4
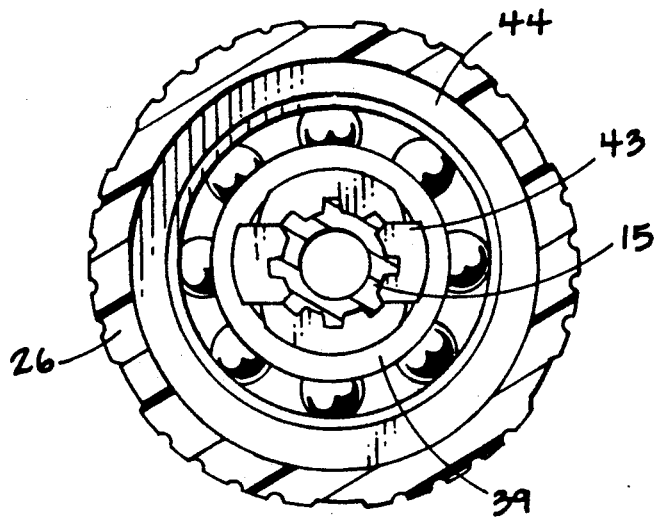
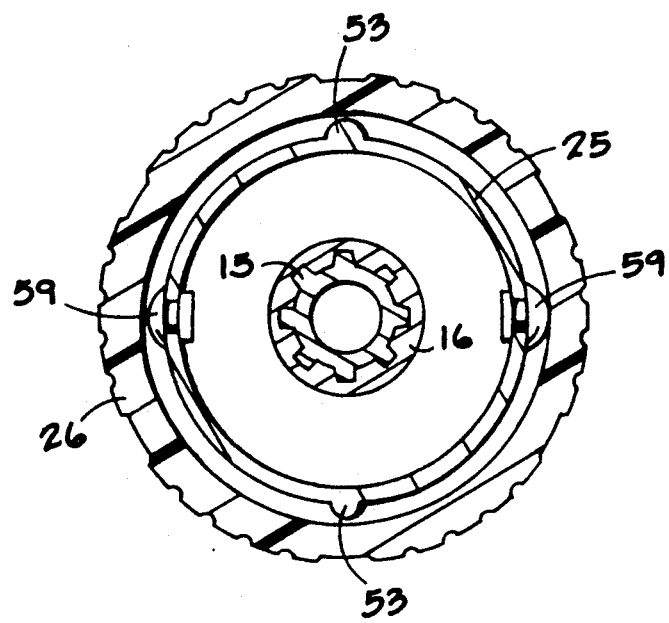
Fig 5

EXTENDIBLE SHAFT ASSEMBLY FOR PORTABLE TOOLS

TECHNICAL FIELD

This invention relates to extensible power shafts for portable tools, such as a chain saw.

BACKGROUND OF THE INVENTION

U.S. Pat. No. 4,654,971 describes a pruner that includes a telescoping drive shaft assembly interposed between a motor or engine and a small chain saw. The apparatus is adapted to permit the user to cut trees or shrubs at a location remote from the user. It is particularly adapted for pruning of trees or shrubs from ground locations.

The present disclosure arose from efforts to produce a commercial version of such a pruner at economical cost and with sufficient precision to withstand the vibrational and torsional loads to which the extensible power shaft assembly is subjected during use. When directed specifically to a pruner, the shaft assembly must operate effectively at lenghts varying from 7 to 11 feet. The weight of the pruner must also be held to a minimum, because of the substantial extension of the equipment from the body of the user and the intended usage of the equipment in a substantially upright position to reach elevated limbs of a tree or shrub. The present inprovements facilitate assembly of the pruner components, and assure axial alignment of the telescoping assemblies to prevent binding or undesirable bearing loads.

BRIEF DESCRIPTION OF THE DRAWINGS

The preferred embodiment of the invention is illustrated in the accompanying drawings, in which:

FIG. 4 is an enlarged cross-sectional view taken along Line 4—4 in FIG. 2;

FIG. 5 is an enlarged cross-sectional view taken along Line 5—5 in FIG. 2;

FIG. 6 is an enlarged cross-sectional view taken along Line 6—6 in FIG. 3;

DETAILED DESCRIPTION OF THE PREFERRED EMBODIMENTS

The following disclosure of the invention is submitted in furtherance with the constitutional purpose of the Patent Laws "to promote the progress of science and useful arts" (Article 1, Section 8).

Figure 1:
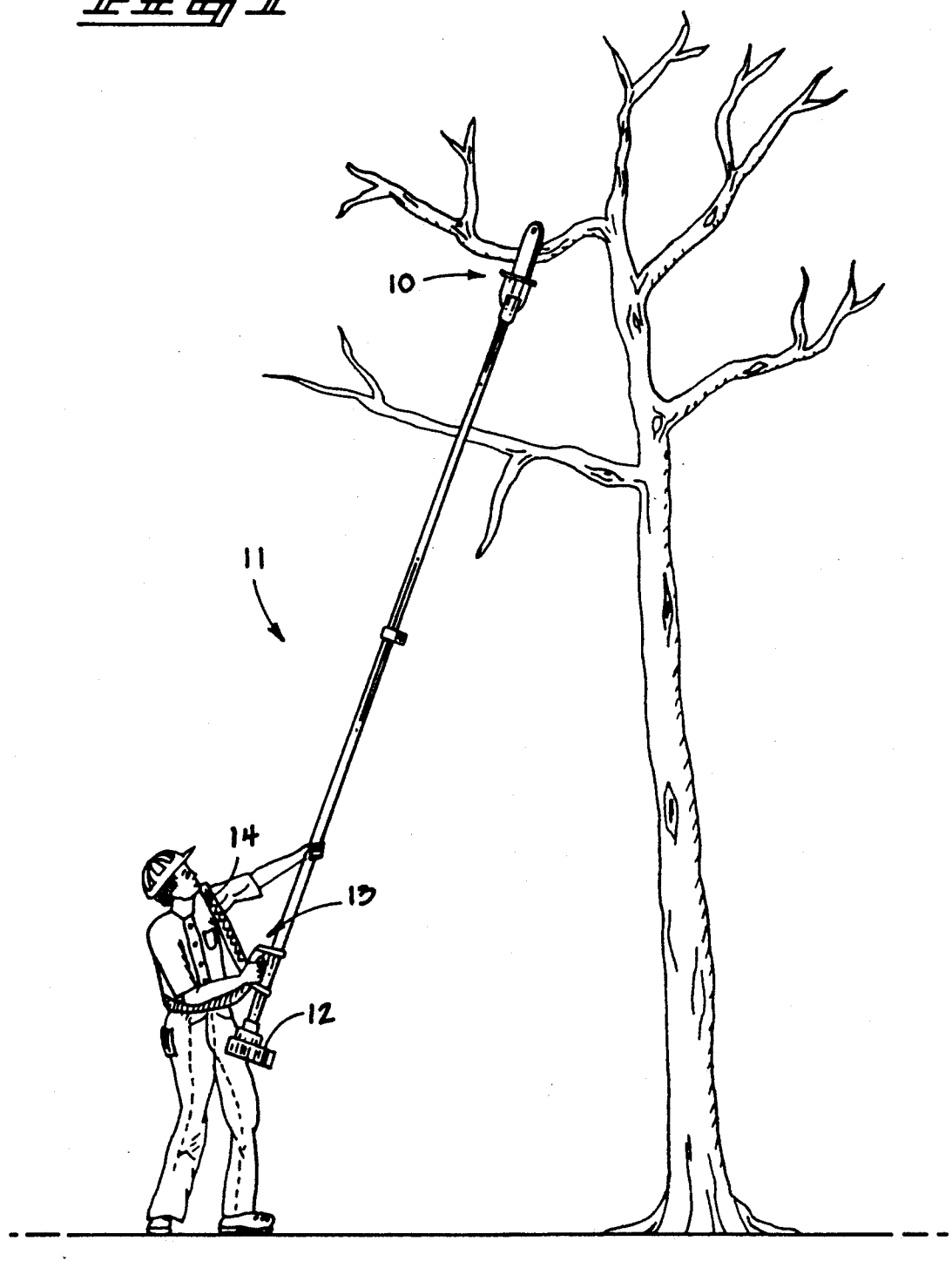
FIG. 1 is a perspective view of a pruner incorporating the present invention.

The present extensible power shaft assembly 11 was designed specifically for use in an extensible power pruner having a cutting head 10 at one end of the shaft assembly 11 and an engine 12 (or motor) at its opposite end as illustrated in FIG. 1. The pruner further includes a manually-held control handle 13 and a flexible body strap 14 used for steadying the pruner when held in an upright position by a user.

The cutting head 10 basically comprises a chain saw. The details of such a chain saw are well known, and not required for an understanding of the present inprovements.

The engine 12 is a conventional fuel-powered engine or electric motor, preferably including manual speed controls for varying the speed of operation of the cutting head 10. Any conventional portable power source can be utilized for this purpose.

The present extensible power shaft assembly was designed specifically for the illustrated pruner, but is adaptable to any portable tool requiring an extensible shaft for transmission of power from a remotely-positioned motor or engine.

Figure 2:
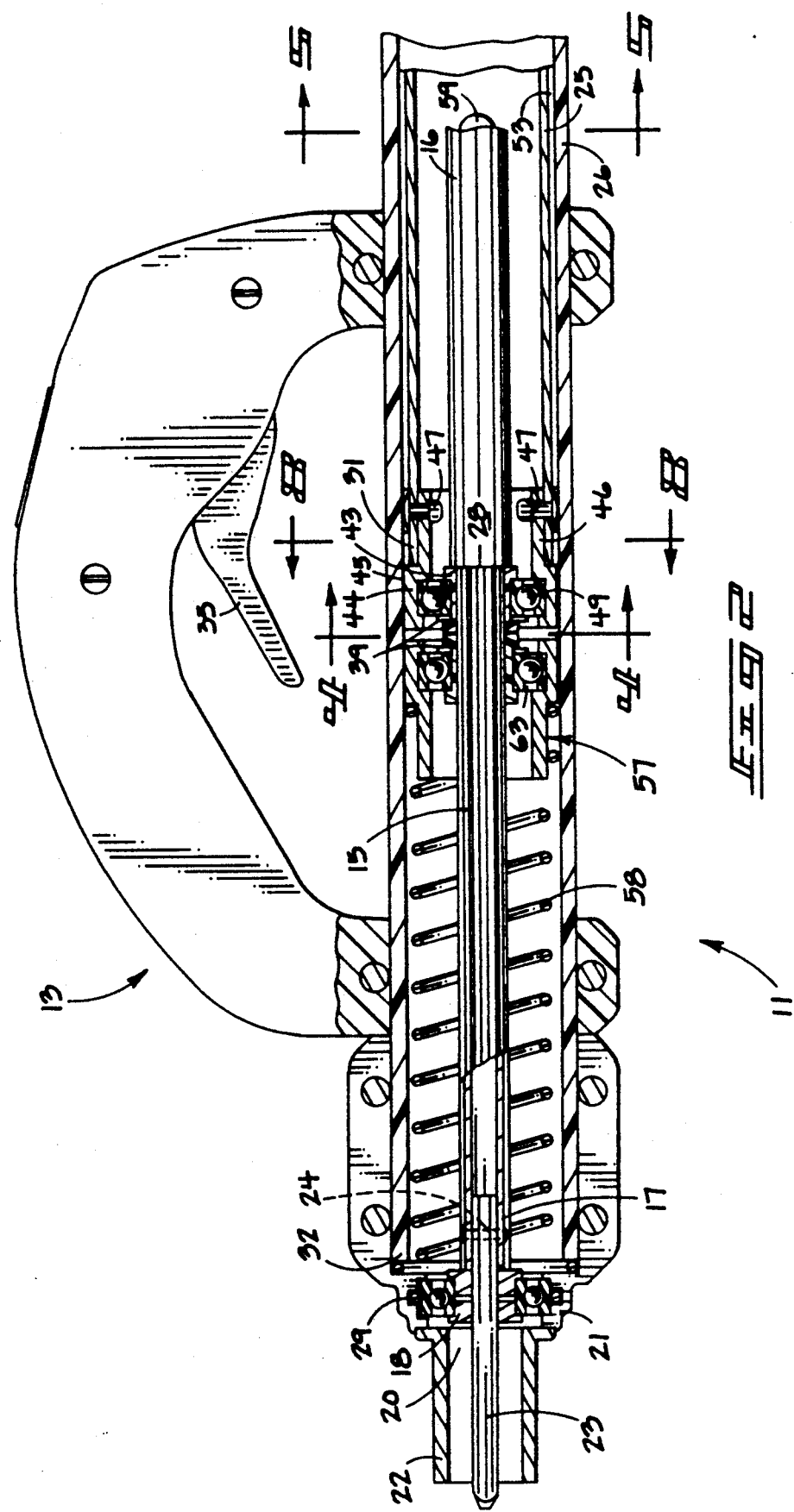
FIG. 2 is a fragmentary sectional view taken along the midline of the present power shaft assembly at its lower end.
Figure 3:
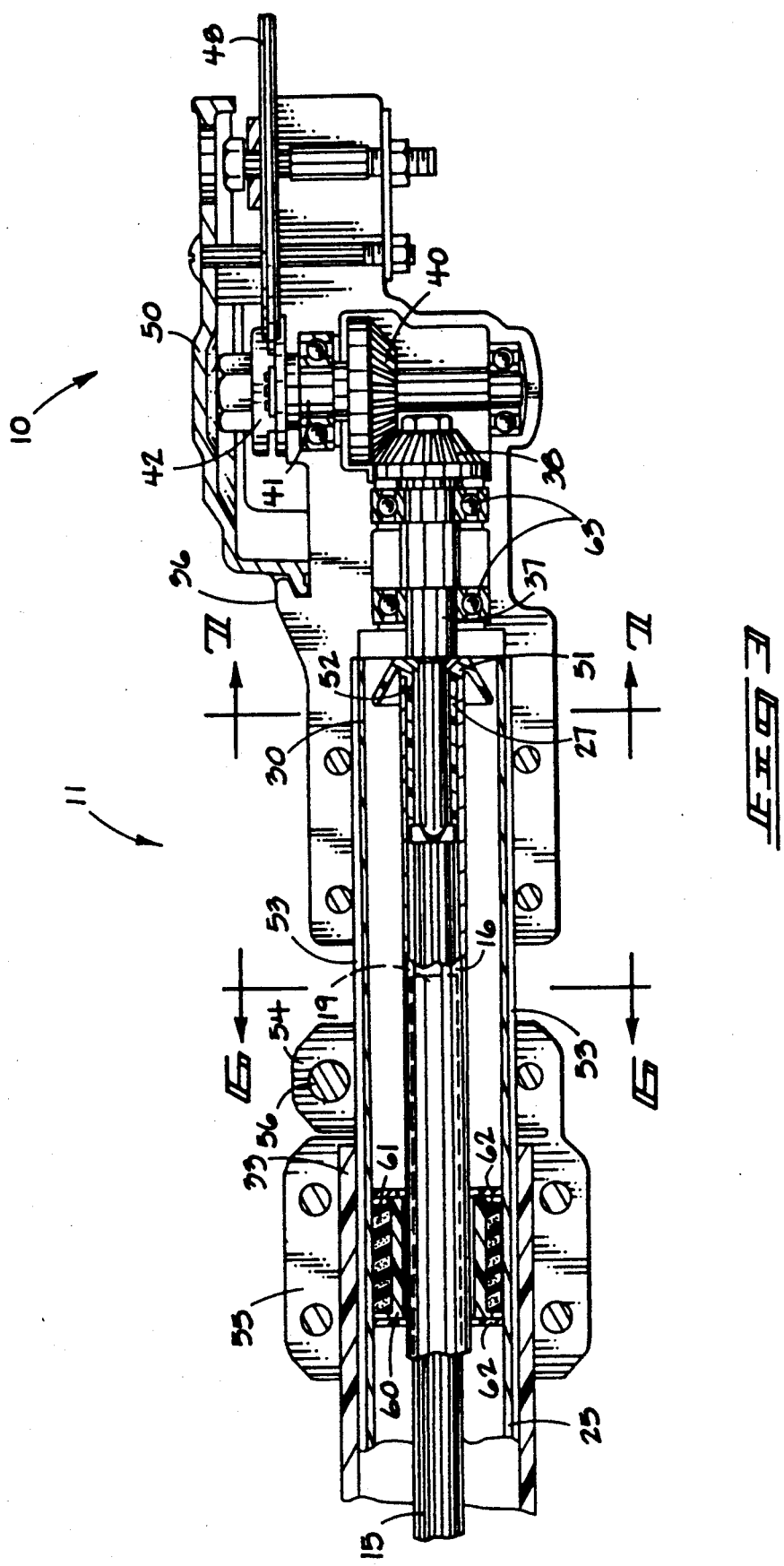
FIG. 3 is a midline sectional view taken through the power shaft assembly at its upper end when in a fully telescoped condition.
Figure 7:
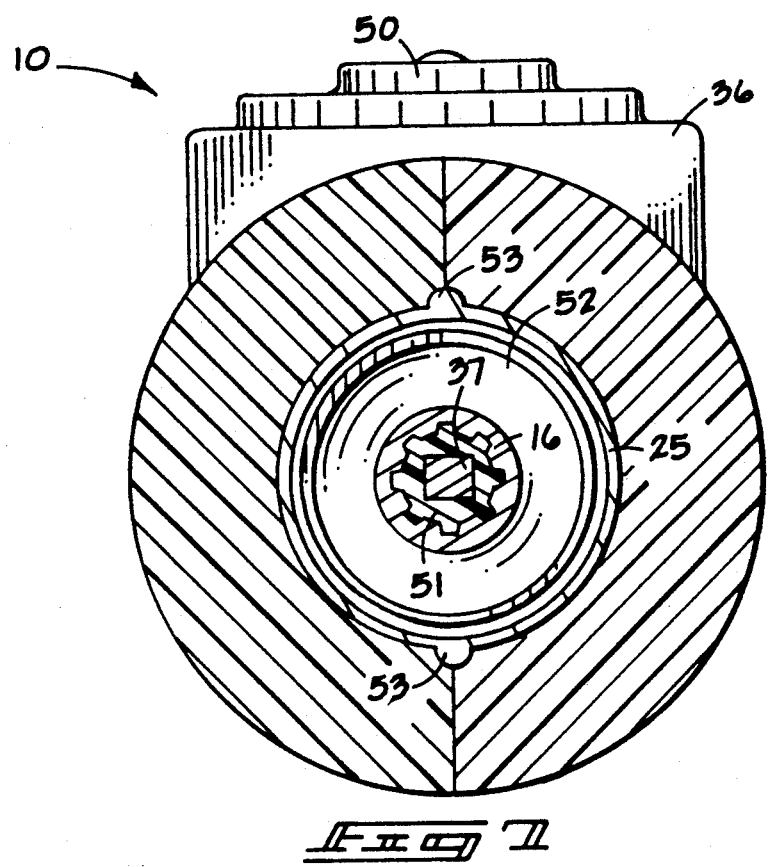
FIG. 7 is an enlarge cross-sectional view taken along line 7—7 in FIG. 3.

The basic structure of the shaft assembly 11 can be understood from the longitudinal sectional views shown in FIGS. 2 and 3. It includes a telescoping axial drive shaft assembly including an inner shaft 15 and an outer shaft 16. The inner shaft 15 extends between a first axial end 17 and a second axial end 19. The outer shaft 16 extends between a first axial end 27 and a second axial end 28.

The second ends 19 and 38 of the inner and outer shafts 15, 16 are slidably mounted in an overlapping relationship to one another. This relationship is illustrated in FIg. 2 where the shaft assembly 11 is shown in a contracted condition. The overlapping inner shaft 15 and outer shaft 16 have complementary splined outer and inner elongated surfaces, respectively, which are adapted to transmit rotary driving force between them regardless of their relative axial positions.

A telescoping housing coaxially surrounds the inner and outer shaft 15, 16. It includes an inner tube 25 and an outer tube 26. The inner tube 25 extends longitudinally between a first axial end 30 and a second axial end 31. The outer tube 26 extends between a first axial end 32 and a second axial end 33. The second ends 31 and 33 of the inner and outer tubes 25, 26 have adjacent outer and inner elongated surfaces, respectively, in an overlapping relationship to one another. This overlapping relationship is shown in the right-hand portion of FIG. 2 and in the left-hand portion of FIG. 3.

First bearing means is connected between the first axial end 32 of the outer tube 26 and the first axial end 17 of the inner shaft 15 (FIG. 2). It rotatably supports the first axial end 17 of inner shaft 15 relative to the outer tube 26 and prevents relative axial movement between them. The first bearing assembly includes a split bearing sleeve 18 fixed on a non-circular section of an engine shaft insert 23, which in turn is fixed within the inner shaft 15 by a radial pin 24. It also includes a ball bearing assembly 20 positioned within a complementary circumferential groove formed within a split end housing 21. A surrounding O-ring 29 radially biases the outer race of assembly 20 toward one side of the housing to assure accurate alignment in the assembled parts.

A cylindrical protruding engine mount 22 is provided on end housing 21 and surrounds the engine shaft insert 23.

The control handle 13 is clamped about the first end 32 of outer tube 26. Handle 13 can include a manually actuated trigger 35 for controlling engine or motor speed and operation. The structural and operational details of handle 13 and trigger 35 are not important to an understanding of the present disclosure.

Second bearing means is provided between the first axial end 30 of the inner tube 25 and the first axial end 27 of the outer shaft 16. It rotatably supports the first axial end 27 of the outer shaft 16 and prevents relative axial movement between the inner tube 25 and outer shaft 16. It is illustrated in FIG. 3 as a pair of coaxial ball bearings 63 within a cutting head housing 36 clamped about the exterior of inner tube 25. The bearings 63 rotatably support a pinion shaft 37 having a driving pinion 38 fixed to it.

Pinion 38 meshes with a complementary driven bevel gear 40 on a perpendicular sprocket shaft 41. Sprocket shaft 41 is shown in a driving relationship to a coaxial sprocket 42 for the drive chain (not shown) of the cutting head 10. The drawings illustrate a conventional chain bar 48 mounted to the cutting head housing 36, as well as a removable sprocket cover 50 that overlaps the area about sprocket 42.

The interconnection provided by the second bearing assembly to the first end 27 of outer shaft 16 also includes an adapter 51 that is press fitted within the interior of outer shaft 16 to rotate in unison with it. Adapter 51 includes an elongated inside surface complementary in cross section to the exterior of pinion shaft 37. The end of adapter 51 includes an inner conical guide surface 52 that guides the end of pinion shaft 37 into the adapter 51 during assembly. It also includes a conically flared extension that loosely centers the adapter 51 and first end 27 of outer shaft 16 within the first end 30 of inner tube 25 when the cutting head housing 36 is not attached to the tube 25. The clearance between the outer periphery of guide surface 52 and the inside surface of the inner tube 25 accommodates slight axial misalignment that might be present between the driven pinion shaft 37 and the driving outer shaft 16.

An intermediate bearing assembly is fixed to the second end 31 of inner tube 25 to provide accurate rotational support between the four telescoping components just described. The location of the intermediate bearing assembly is also axially adjacent to the second end 28 of the outer shaft 16. As shown in FIG. 2, the second end 28 of outer shaft 16 freely abuts the bearing sleeve 43.

Figure 8:
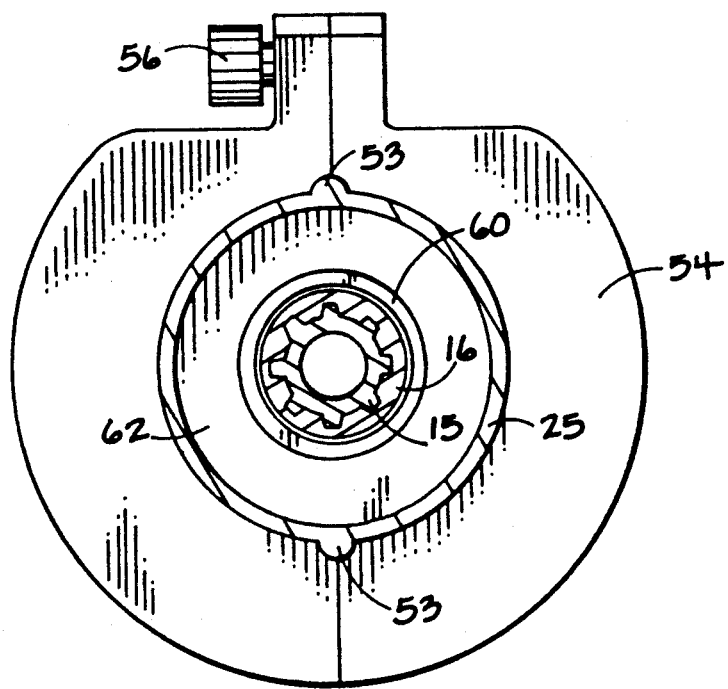
FIG. 8 is an enlarged cross-sectional view taken along Line 8—8 in FIG. 2.
Figure 8:
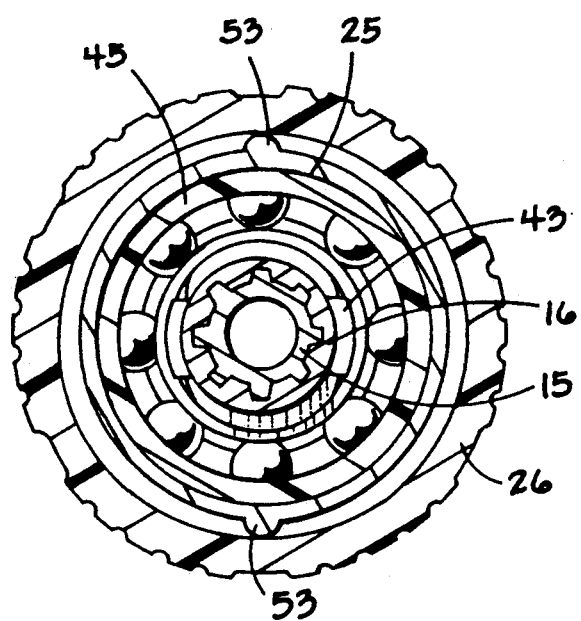

The intermediate bearing assembly includes a conventional ball bearing 49 arrange about a drive shaft bearing sleeve 43 and serving as "inner bearing means". Ball bearing 49 is operably connected between the inner tube 25 and the inner shaft 15 for rotatably and slidably supporting the inner shaft relative to the inner tube. As can be seen in FIGS. 4 and 8, the bearing sleeve 43 is constructed of four segments that axially abut one another when assembled within the inner race of ball bearing 49. A circular wave spring 39 is positioned axially between the inner race of the ball bearing 49 and circumferential flanges about the assembled bearing sleeve 43 to load the driven inner race.

The intermediate bearing assembly also includes "outer bearing means" in the form of a radially split bearing holder 44, whose periphery includes a bushing shown as a cylindrical bearing surface 45. The bearing holder 44 is operably connected between the inner tube 25 and the outer tube 26 for coaxially supporting the outer tube 26 relative to the inner tube 25 while permitting relative axial movement between them. The bearing holder 44 is completed by a cylindrical extension 46 fixed to the inner surface of inner tube 25 by rivets 47 (FIG. 2).

The combination of the first and second bearing assemblies at the outer ends of the shaft assembly 11 serve to assure free rotational driving connections without binding or uneven bearing loads at the driving and driven connections made by the shaft assembly 11. The intermediate bearing assembly assures that there is an accurate coaxial rotating support for the overlapping portions of inner shaft 15 and outer shaft 16 positioned at the second end 28 of the outer shaft 16. It also provides coaxial support to the surrounding inner and outer tubes 25 and 26 at the same floating location, at the second end 31 of the inner tube 25.

Angular indexing of the cutting head housing 36 relative to the driving end of the shaft assembly 11 is provided by elongated ribs 53 that extend the full length along the outside surface of inner tube 25. Ribs 53 are engaged by a complementary compression clamp 54 directly adjacent to the second end 33 of outer tube 26 (FIG. 3). The compression clamp 54 is part of a mounting clamp 55 fixed about the outside surface of the outer tube 26. Compression clamp 54 is secured by a releasable bolt and handle 56 to permit extension of the tubes 25, 26 relative to one another. The complementary grooves that engage ribs 53 maintain the angular indexing required by cutting head housing 36 at all positions of the tubes 25, 26 relative to one another.

Protruding rivets 59 (FIG. 2) along the inner tube 25 limit axial extension of the inner tube 25 relative to the outer tube 26. When tubes 25 and 26 are fully extended, the rivets 59 will abut the releasable compression clamp 54 at the second end 33 of outer tube 26. The entire shaft assembly 11 can be readily disassembled by removing compression clamp 54 and pulling the components axially apart.

FIG. 2 illustrates a further improvement designed to counteract "whipping" of the elongated inner shaft 15 when the shaft assembly 11 is extended from the position illustrated. A floating bearing assembly 57 is interposed between the outside surfaces of inner shaft 15 and the inside surfaces of outer tube 26. Bearing assembly 57 is axially movable along the length of inner shaft 15 and slidably engages the inner surface of the outer tube 26 for rotatably supporting the inner shaft 15 relative to the outer tube 26 while permitting free axial movement of the floating bearing assembly 57 relative to both the inner shaft 15 and the outer tube 26.

The illustrated floating bearing assembly 57 is identical to the components of the previously-described intermediate bearing assembly (drive shaft sleeve 43, bearing holder 44, cylindrical bearing surface 45, and cylindrical extension 46). This duplication of components is economical, but not vital to the provision of a floating bearing assembly as illustrated. As can be seen in FIG. 2, the floating bearing assembly 57 is reversed axially from the position assumed by the same components at the second end of the inner tube 25.

The floating bearing assembly 57 is biased from the first ends 17 and 32 of the inner shaft 15 and outer tube 26 by means of a light compression spring 58 that coaxially surrounds the inner shaft 15 within the confines of the outer tube 26. The end of light compression spring 58 adjacent to bearing 20 is wound slightly larger than the inside diameter of the outer tube 26. The enlarged spring end is mechanically clamped at the first end 32 of the outer tube 26.

The remaining length of the spring 58 has a slightly smaller diameter than the inside diameter of outer tube 26 and is wound about the cylindrical extension protruding from the floating bearing assembly 57. This smaller end frictionally engages and clamps against the axial extension. The spring thus yieldably holds the floating bearing assembly 57 against falling axially along outer tube 26 if the cutting head 10 is positioned lower than the engine 12.

The length of spring 58 is selected to position floating bearing assembly 57 approximately half way between the first bearing assembly (at the left in FIG. 2) and the intermediate bearing assembly when the shaft assembly 11 is fully extended. The bearing assembly 57 physically restrains radial movement of the unsupported sections of inner shaft 15 to prevent whipping within the outer tube 26 and possible contact between the shaft 15 and the inside surfaces of the outer tube.

Whipping of the outer shaft 16 can be counteracted by a cushioned bearing assembly radially positioned between the outer shaft 16 and the inner tube 26 at an axial location spaced between the second bearing assembly (at the right in FIG. 3) and the second end 31 of the inner tube 25. The cushioned bearing assembly provides a radially compressible surface that is adapted to be operably engaged between the outside surface of the shaft 16 and the inside surface of the tube 25 for damping energy imparted to it by radial movement of the shaft within the tube.

The cushioned bearing assembly is illustrated as a spool 60 surrounded by a yieldable foam cylinder 61. Spool 60 has radially protruding shoulders at each of its axial ends, the outer diameter of each shoulder being less than the diameter of the inside surface of the tube 25. The inside diameter of the spool 60 is greater than the diameter of the outside surface of the shaft 16.

The inner cylindrical surface of sleeve 60 loosely fits about the outside surfaces of the outer shaft 16 and is contacted only as a result of bending or whipping of the intermediate portions of shaft 16. It can be fixed in location along the length of inner tube 25 by frictional engagement of abutting snap rings 62 that axially abut it at each end.

The yieldable foam cylinder 61 dissipates energy imparted to spool 60 due to radial motion of the elongated shaft 16. Its purpose is to dampen the radial movement of the unsupported portions of outer shaft 16 to counteract "whipping" that might occur at various speeds and applied loads. The location of sleeve 60 as shown in FIG. 3 is not to scale. Typically, one spool 60 should be located at approximately the center of the elongated outer shaft 16. A plurality of such spools can be spaced along the length of outer shaft 16, if needed, without impeding operation of the components described above.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims appropriately interpreted in accordance with the doctrine of equivalents.

I claim:

1. An extensible power shaft assembly for portable tools, comprising:
 a telescoping axial drive shaft assembly including a pair of overlapping inner and outer shafts each having first and second axial ends;
 the inner and outer shafts having complementary outside and inside surfaces, respectively, to transmit rotary driving force between them regardless of their relative overlapping axial positions;
 a telescoping housing coaxially surrounding the drive shaft assembly;
 the housing including a pair of inner and outer tubes mounted in an overlapping relationship to one another, the inner and outer tubes each including first and second axial ends and having adjacent outside and inside surfaces, respectively;
 first bearing means connected between the first axial end of the outer tube and the first axial end of the inner shaft for rotatably supporting the first axial end of the inner shaft;
 second bearing means connected between the first axial end of the inner tube and the first axial end of the outer shaft for rotatably supporting the first axial end of the outer shaft; and
 an intermediate bearing assembly fixed to the second end of the inner elongated tube;
 the intermediate bearing assembly including inner bearing means slidably engaging the outer surface of the inner shaft for rotatably supporting the inner shaft relative to the inner tube and for permitting relative axial movement between them;
 the intermediate bearing assembly further including outer bearing means engaging the inner surface of the outer tube for coaxially supporting the outer tube relative to the inner tube and for permitting relative axial movement between them.

2. The extensible power shaft assembly of claim 1 wherein the location of the intermediate bearing assembly is axially adjacent to the second end of the outer shaft.

3. The extensible power shaft assembly of claim 1 wherein the complementary outside and inside elongated surfaces of the inner and outer shafts are splined.

4. The extensible power shaft assembly of claim 1 wherein the first bearing means comprises a ball bearing.

5. The extensible power shaft assembly of claim 1 wherein the outer bearing means comprises a bushing having an outside surface complementary to the inner surface of the outer tube.

6. The extensible power shaft assembly of claim 1 wherein the outside surface of the inner tube includes at least one radially protruding rib extending between its first and second ends, and further comprising;
 clamp means fixed to the second end of the outer tube for preventing relative rotational movement between the inner and outer tubes and for selectively fixing them relative to one another, the clamp means including a radially movable surface complementary to the cross sectional configuration of the outside surface and rib along the inner tube.

7. The extensible power shaft assembly of claim 1 further comprising:
 a floating bearing assembly axially spaced between the first bearing means and the second end of the inner tube;
 the floating bearing assembly including inner bearing means slidably engaging the outside surface of the inner shaft and outer bearing means slidably engaging the inside surface of the outer tube for rotatably supporting the inner shaft relative to the outer tube while permitting free axial movement of the floating bearing assembly relative to both the inner shaft and the outer tube.

8. The extensible power shaft assembly of claim 1 further comprising:

a floating bearing assembly axially spaced between the first bearing means and the second end of the inner tube;

the floating bearing assembly including inner bearing means slidably engaging the outside surface of the inner shaft and outer bearing means slidably engaging the inside surface of the outer tube for rotatably supporting the inner shaft relative to the outer tube while permitting free axial movement of the floating bearing assembly relative to both the inner shaft and the outer tube; and yieldable means located radially between the outer tube and the inner shaft and axially between the first bearing means and the floating bearing assembly for urging the floating bearing assembly to a location spaced from the first bearing means by a preselected axial distance.

9. The extensible power shaft assembly of claim 1 wherein the first bearing means includes a radially movable bearing yieldably mounted to the first end of the inner shaft to accommmodate a limited radial offset of a parallel external shaft.

10. The extensible power shaft assembly of claim 1 wherein the first end of the outer shaft is free to move radially relative to the first end of the inner housing tube to accommodate a limited radial offset of a parallel external shaft.

11. The extensible power shaft assembly of claim 1 wherein the first end of the outer shaft is free to move radially relative to the first end of the inner housing to accommodate a limited radial offset of a parallel external shaft; and a coaxial adapter with the first end of the outer shaft, the adapter having an axial aperture surrounded by a conical opening adapted to direct an external shaft into the aperture.

12. The extensible power shaft assembly of claim 1 further comprising:

a cushioned bearing assembly radially positioned between the outer shaft and the inner tube at an axial location spaced between the second bearing means and the second end of the inner tube;

the cushioned bearing assembly including a radially compressible surface operably engaged between the outside surface of the outer shaft and the inside surface of the inner tube for damping energy imparted to it by radial movement of the outer shaft within the inner tube.

13. An extensible power shaft assembly for portable tools, comprising:

a telescoping axial drive shaft assembly including inner and outer elongated shafts each having first and second axial ends, the second ends of the inner and outer shafts being mounted in an overlapping slidable relationship to one another and having complementary outside and inside surfaces, respectively, to transmit rotary driving force between them regardless of their relative overlapping axial positions;

a telescoping housing coaxially surrounding the drive shaft assembly, the housing including inner and outer tubes each having first and second axial ends, the second ends of the inner and outer tubes having adjacent outside and inside surfaces, respectively, positioned in an overlapping relationship to one another; and bearing means connected between the first axial end of the inner tube and the first axial end of the outer shaft for rotatably supporting the first axial end of the outer shaft;

the first end of the outer shaft being free to move radially relative to the first end of the inner housing to accommodate a limited radial offset of a parallel external shaft; and a coaxial adapter on the first end of the outer shaft, the adapter having an axial aperture surrounded by a conical opening adapted to direct an external shaft into the aperture.

14. A extensible power shaft assembly for portable tools, comprising:

a telescoping axial drive shaft assembly including inner and outer elongated shafts each having first and second axial ends, the second ends of the inner and outer shafts being mounted in an overlapping slidable relationship to one another and having complementary outside and inside surfaces, respectively, to transmit rotary driving force between them regardless of their relative overlapping axial positions;

a telescoping housing coaxially surrounding the drive shaft assembly, the housing including inner and outer tubes each having first and second axial ends, the second ends of the inner and outer tubes having adjacent outside and inside surfaces, respectively, positioned in an overlapping relationship to one another;

bearing means connected between the first axial end of the outer tube and the first axial end of the inner shaft for rotatably supporting the first axial end of the inner shaft and for preventing relative axial movement between them; and a floating bearing assembly axially spaced between the bearing means and the second end of the inner tube;

the floating bearing assembly including inner bearing means slidably engaging the outside surface of the inner shaft and outer bearing means radially adjacent the inside surface of the outer tube for rotatably supporting the inner shaft relative to the outer tube while permitting free axial movement of the floating bearing assembly relative to both the inner shaft and the outer tube.

15. The extensible power shaft assembly of claim 14 further comprising:

yieldable means located radially between the outer tube and the inner shaft and axially between the first bearing means and the floating bearing assembly for urging the floating bearing assembly to a location spaced from the first bearing means by a preselected axial distance.

16. An extensible power shaft assembly for portable tools, comprising:

a telescoping axial drive shaft assembly including inner and outer elongated shafts each having first and second axial ends, the second ends of the inner and outer shafts being mounted in an overlapping slidable relationship to one another and having complementary outside and inside surfaces, respectively, to transmit rotary driving force between them regardless of their relative overlapping axial positions;

a telescoping housing coaxially surrounding the drive shaft assembly, the housing including inner and outer tubes each having first and second axial ends, the second ends of the inner and outer tubes having adjacent outside and inside surfaces, respectively, positioned in an overlapping relationship to one another; and bearing means connected between the first axial end of the inner tube and the first axial end of the outer shaft for rotatably supporting the first axial end of the outer shaft;

a cushioned bearing assembly radially positioned between the outer shaft and the inner tube at an axial location spaced between the bearing means and the second end of the inner tube;

the cushioned bearing assembly including a radially compressible surface operably positioned radially between the outside surface of the outer shaft and the inside surface of the inner tube.

* * * * *